Jan. 10, 1961 W. R. FARRALL 2,967,451
METHOD AND APPARATUS FOR GAS ANALYSIS
Filed April 4, 1957 4 Sheets-Sheet 3
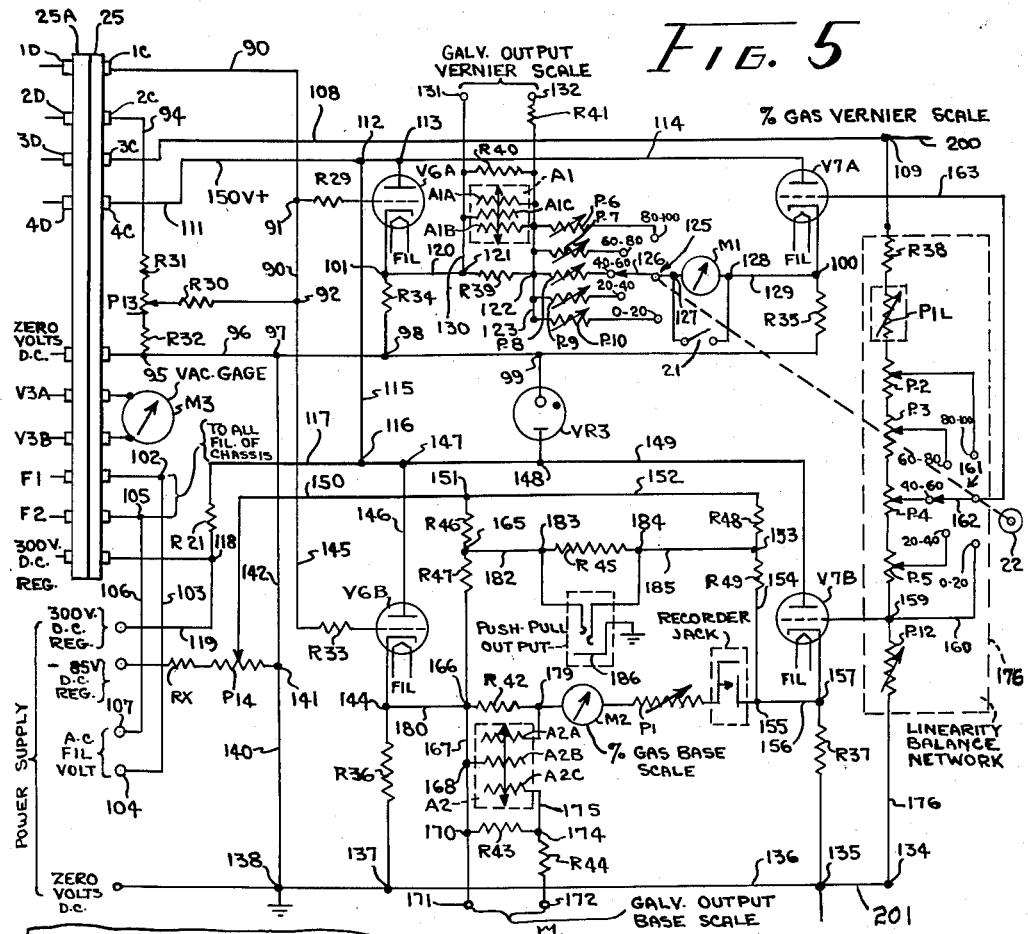
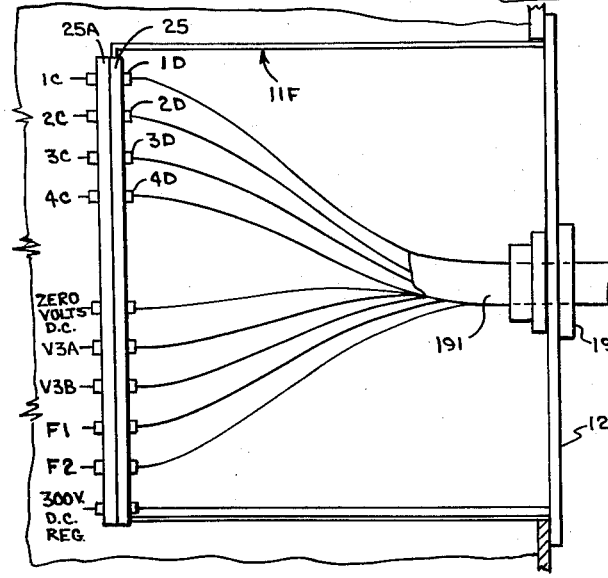
INVENTOR.
WILLIAM R. FARRALL
BY Ralph L. Dugger
ATTORNEY

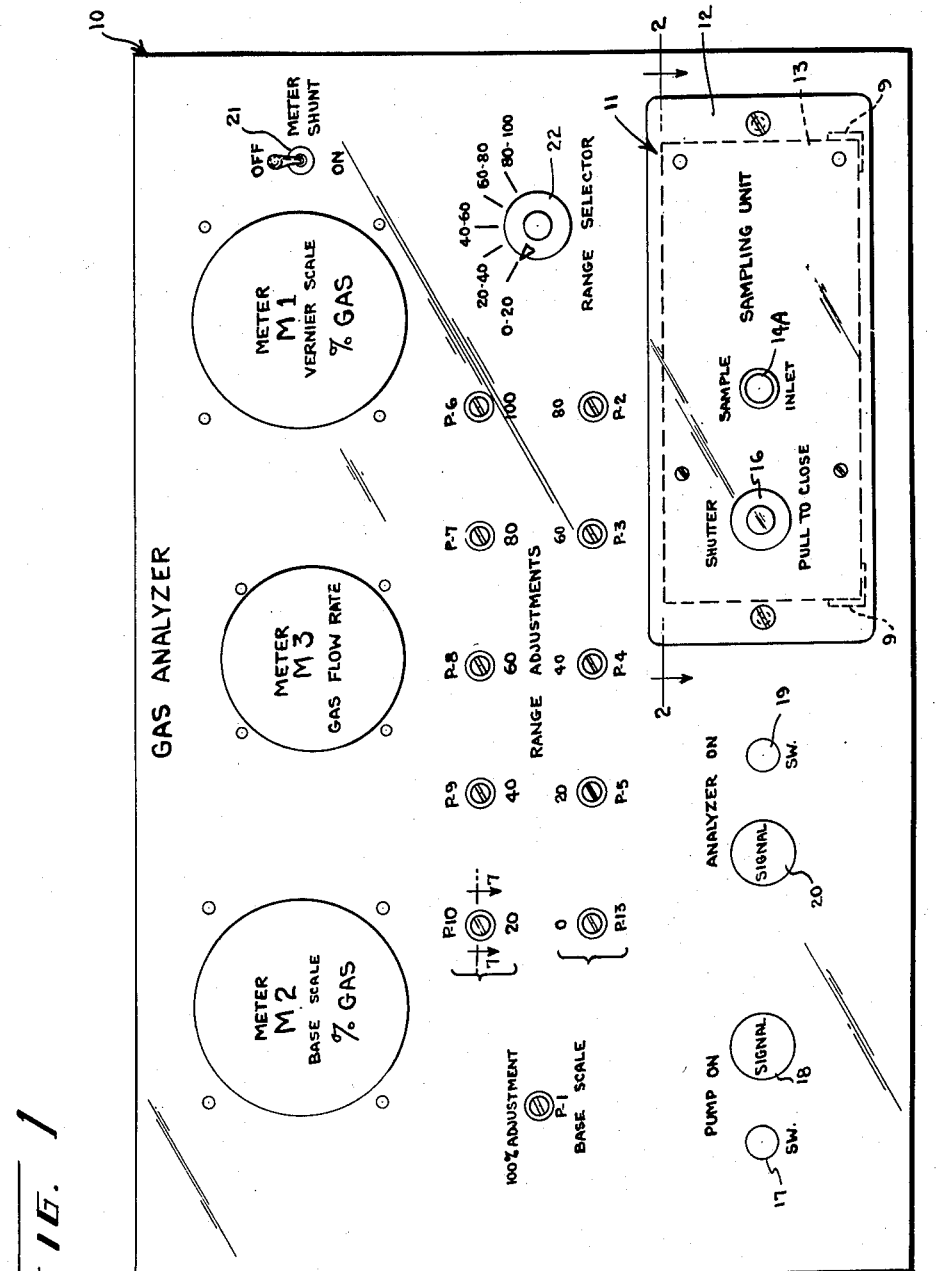

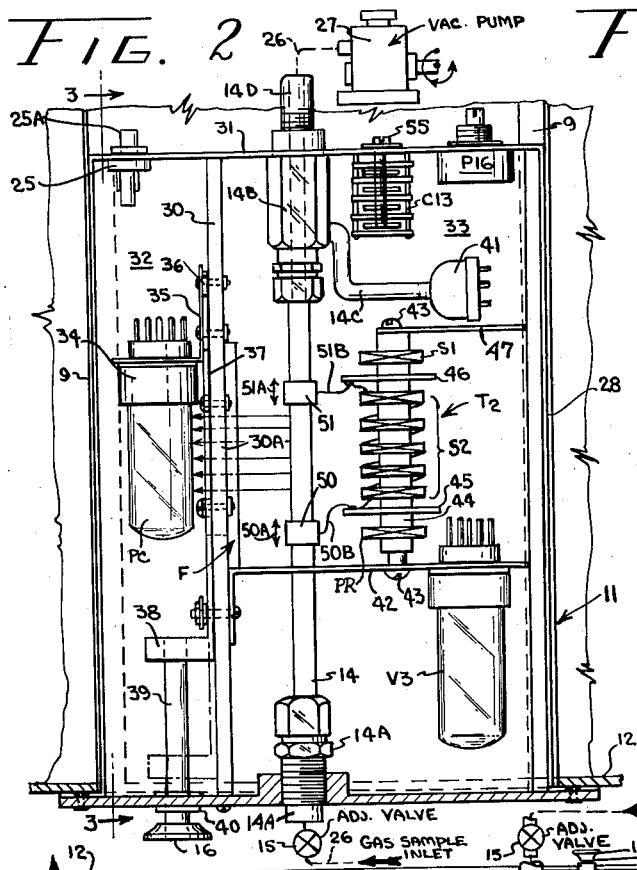

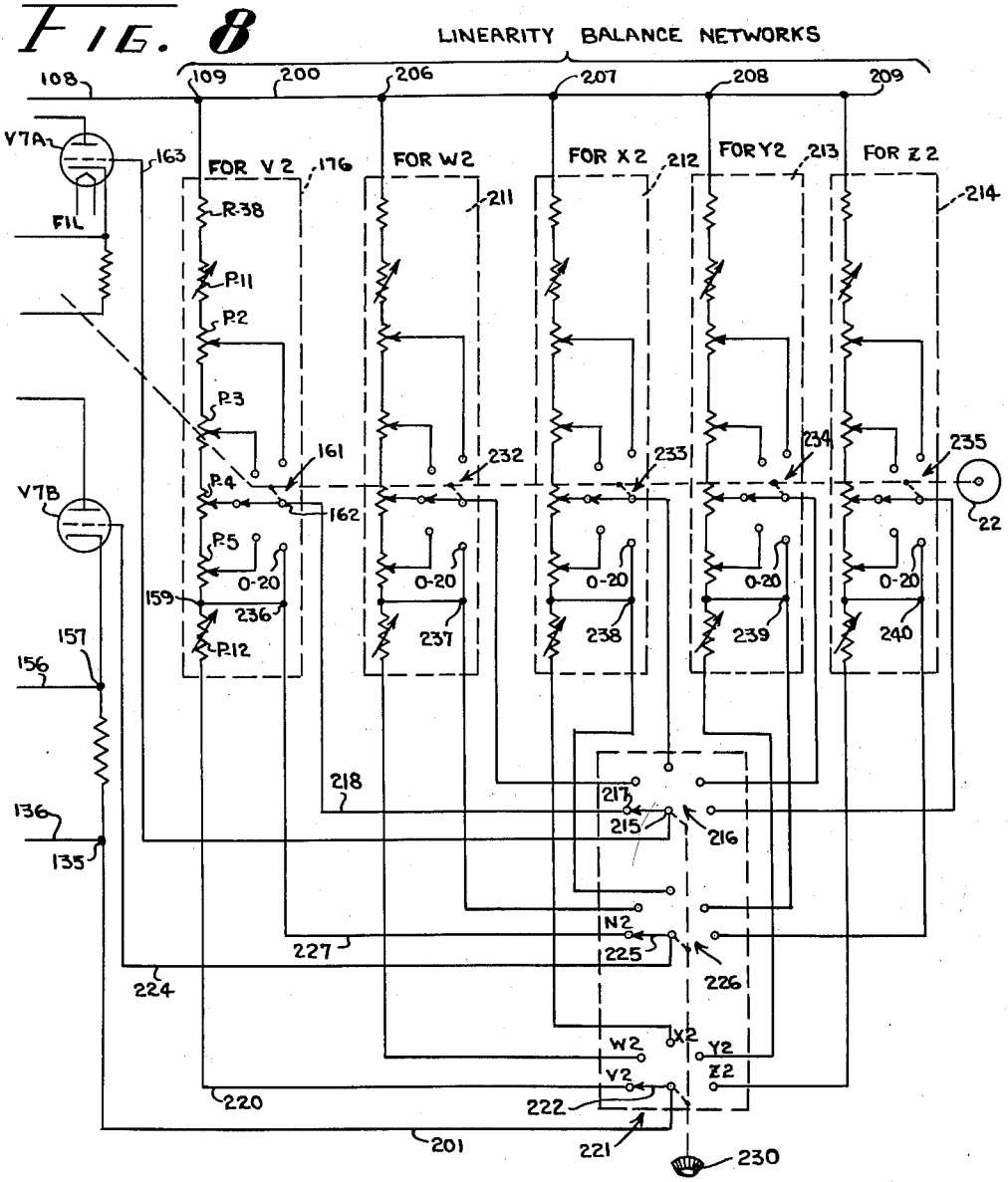

United States Patent Office 2,967,451
Patented Jan. 10, 1961

2,967,451
METHOD AND APPARATUS FOR GAS ANALYSIS

William R. Farrall, Rochester, Minn., assignor to The Waters Corporation, Rochester, Minn., a corporation of Minnesota Filed Apr. 4, 1957, Ser. No. 650,584

5 Claims. (Cl. 88—14)

This invention relates to method and apparatus for the very rapid and very accurate determination of the percentages of particular gases in a mixture of gases. The invention relates particularly to method and apparatus for use in the research, particularly medical and industrial research, and also to those problems in industrial production which require the accurate and rapid determinations of percentages of gases in particular gaseous mixtures.

Thus in connection with medical research relating to tuberculosis the physician will frequently desire to make a determination of lung damage on the basis of the amount of particular gases expired after inspiration of prescribed gases. Thus the patient may be permitted to inhale pure oxygen for a period of time after which a reading is taken to determine the precise percentage constituency of the gas exhaled. For such work it is desirable to have an accuracy in the range of one tenth of one percent.

In many instances of industrial processes it is desirable to obtain very rapidly the percentage determination of a particular gas in a mixture. For this purpose it is frequently desirable to have a response rate of one second or less.

In many instances of research and industrial use it is desirable to be able to analyze gases from an unknown sample and determine first in an approximate manner the range of percentage of a particular constituent in the gas. After such general determination has been made, it is desirable to be able to determine the percentage of such gas with a high degree of accuracy. In other instances of research and industrial work it is desirable to be able accurately and rapidly to analyze a gas sample for each of a number of constituents of gases therein. This should be done without undue expense and by use of apparatus which is convenient and relatively light weight.

It is an object of the present invention to provide a method and apparatus for analyzing gas accurately and rapidly. It is a further object of the invention to provide a method and apparatus for analyzing gas, wherein an unknown gas may be analyzed roughly for various constituents of the gas therein and then analyzed accurately and rapidly for the constituents thereof. It is another object of the invention to provide an apparatus of great versatility capable of analyzing a variety of gases. It is a further object of the invention to provide method and apparatus which may be used conveniently in the field or in the laboratory either at or remote from the source of the gas sample.

Other and further objects of the invention include the provision of method and apparatus which may be used for the analyzing of gas wherein such analysis may be accomplished without undue expense by relatively inexperienced personnel.

Other and further objects of the invention are those inherent in the apparatus and method herein illustrated, described and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein Figure 1 is a front elevational view of an apparatus which is illustrative of the invention.

Figure 2 is a fragmentary partially schematic horizontal sectional view, with some parts removed, taken along the line and in the direction of arrows 2—2 of Figure 1.

Figure 3 is a fragmentary vertical sectional view taken along the line and in the direction of arrows 3—3 of Figure 2.

Figure 4 is a schematic horizontal sectional view of the drawer apparatus shown in Figures 2 and 3, wherein the circuits are illustrated and mechanical elements shown schematically.

Figure 5 is a wiring diagram of the circuit apparatus of the invention with the exception of those parts of the circuit apparatus shown in Figure 4. In use the drawer apparatus shown in Figures 2, 3 and 4 is mechanically mounted upon and electrically connected to the circuit apparatus shown in Figure 5 so as to complete the circuit of the system.

Figure 6 is a fragmentary partial horizontal sectional view, and with some parts shown schematically, illustrating a modified form of the invention wherein the gas analyzing apparatus is located remotely in respect to the sampling apparatus.

Figure 7 is a fragmentary horizontal sectional view in the direction of arrows 7—7 of Figure 1.

Figure 8 is a fragmentary wiring diagram showing a modified form of the invention adapted for use where it is desired to analyze rapidly a gas sample for a variety of gaseous components thereof.

Throughout the drawings corresponding numerals refer to the same parts.

According to the present invention the gas undergoing sampling is introduced through an adjustable valve, for example an adjustable needle valve or adjustable orifice, into the sample delivery tube, whence it is conducted directly into the sampling apparatus ionization tube. The flow of gas into the sampling apparatus ionization tube is maintained by connecting to such ionization tubes a vacuum pump of large capacity, capable of maintaining in the gas analyzing apparatus sampling tube at a vacuum sufficient to cause ionization, as for example, 500 microns pressure. Any pressure above or below this pressure at which ionization occurs, will provide satisfactory operation, close regulation of vacuum being unessential. Regulation of the vacuum, when desired, may be achieved by adjustment of valve 15. I prefer to use as the ionization tube a straight quartz tube as for example a quartz tube of one quarter inch outside diameter and one eighth inch inside diameter and to connect thereto at one end the adjustable needle valve through which the sample is adapted to be introduced and to connect the other end to the vacuum pump. The line from the gas sample source is desirably kept as short as possible so as to reduce the time lag between the condition existing in the gas desired to be sampled, and the gas percentage reading given by the invention. Also it is desirable that the tube leading from the apparatus to the source of the sample should be of relatively small diameter so that the volume of the gas in the tube will be small. Thus it is desirable that the sampling tube leading from the analyzer apparatus to the source of supply should be short and of a small practical diameter consistent with good mechanical strength and consistent with a reasonable flow of the sample gas therethrough. However, this sample lead-in tube should not be of such small bore or so long that it will by itself produce a molecular fractionation of the gases, because the sample would then be unreliable.

Closely adjacent to the sampling apparatus there is placed the adjustable orifice through which the sample is drawn, and for this purpose I may use an adjustable needle valve. From the needle valve the connection is made directly to the ionization tube of the apparatus.

The ionization tube is preferably about one quarter inch outer diameter with a bore of approximately one eighth inch and can be of a convenient length as for example seven to eight inches long. The flow of sample gas thus introduced through the needle valve into the ionization tube moves directly through the tube and is withdrawn from the opposite end thereof by a vacuum pump of adequate capacity.

The exact capacity of the vacuum pump is not critical since by adjusting the rate of inflow of gas through the needle valve, the pressure maintained in the ionization tube can be kept within the aforesaid limits in which ionization and electrical conductivity will occur, even though the flow is relatively great or small. Thus the rate of flow is adjusted with reference to the capacity of the vacuum pump so as to allow ionization of the gas within the tube and consequent conductivity, to occur. A side connection from the ionization tube is provided leading to a gauge for indicating the rate of flow of the sample through the apparatus.

There are no electrodes within the ionization tube but around them at spaced intervals are placed electrodes, to which radio frequency potential is applied. I prefer to use a radio frequency in the approximate range of 200–400 kilocycles. This radio frequency potential is of adequate voltage to produce and maintain ionization and conductivity of the gases within the tube.

I have discovered that the ionization of the gas sample will produce light within the tube, the amount of which is proportional to the percentage of a particular gas therein. This is true of each constituent of a gaseous mixture and a light fraction of the spectrum, which is characteristic of a certain gaseous constituent, can thus be isolated (by filtering off other wave lengths), with assurance that the amount (intensity) of the wanted light fraction will be indicative of the amount of that particular gas in the mixture which produces such light fraction in the spectrum. The ionization tube is used as a source of light and the light therefrom is passed through a suitable filter (or light fractionator) which removes all wave lengths that are undesired and permits the passage of the desired wave length or wave lengths of the spectrum of a particular gas in the sample undergoing consideration and analysis. Such desired wave lengths are permitted to pass through the filter onto a photoelectric cell which produces a signal.

The output of the photoelectric cell is thus a signal, the strength of which is proportional to the amount of light emitted in a particular light band wave length, and this in turn is proportional to the amount of a particular gas in the sample being analyzed.

By selection of an appropriate filter, and by careful calibration of the system, I am able to provide an output reading of great reliability and an output signal which may be used for a recorder. Such signal and reading are indicative within a fraction of a percent of the percentage of a particular gas in the sample.

According to my invention, as hereinafter described, the meter readings may be adjusted appropriately so as to provide a reading which is proportional division-for-division to the percentage of gas in the sample or stated another way a linear scale indication is provided.

Also according to my invention the gas analyzing tube, radio frequency power supply, photoelectric cell and filter apparatus, together with all necessary or desirable adjuncts thereof may be made separable as a component from the remaining parts of the apparatus, and several such separable components may be provided each pre-adjusted for a particular gas, so as to permit the rapid and accurate determination of the percentages of various gases in the same or different samples.

Referring to the drawing of Figure 1, there is illustrated therein a housing having a front panel generally designated 10, Figure 1 being a front view of such housing. In the housing, are contained all of the necessary components of the apparatus with the exception of the vacuum pump and needle valve. Extending entirely through the housing, from front-to-back is an opening 13 framed by slides 9, which serve as rails for a drawer generally designated 11 which has a front panel 12 thereof, which fits against the front cabinet and closes the opening 13 into which the drawer slides. In this drawer are contained the oscillator and circuitry of the power supply for furnishing radio frequency energy to the terminals of the gas analyzing ionization tube and in the drawer are also contained a suitable mechanical shutter, a light filter appropriate for analyzing the sample for a particular gas, a photoelectric cell, and a sensitive instrument by which the rate of flow of gas through the sampling tube is signalled. On the front of the drawer, which slides horizontally through the cabinet on rails 9, is provided a tube 14A which is a coupling projecting forwardly from the front 12 of the drawer. The tube 14A is the inlet of the gas analysis ionization tube, and to such inlet 14 there is attached a connection leading to an adjustable needle valve 15, see Figures 2 and 4. Also on the front of the cabinet is a knob 16 which controls the light shutter by means of which the flow of light emitted by the gas analyzing ionization tube, to the photocell, may be completely shut off.

At the lower left-hand portion of the housing there is provided a control switch 17 by means of which the vacuum pump may be turned on and off, and a signal 18 which indicates when power is applied to the pump. Adjacent, is another switch 19 which serves as a master switch for applying electrical input power to the gas analyzer unit (including the pump circuit) and a signal 20 which indicates when the power is on. At the upper part of the panel 10 there is a meter M3 which indicates the rate-of-flow of the gas being analyzed and a meter M2 which indicates approximately the percentage (on a scale of 0% to 100%) of the particular gaseous constituent in the sample being analyzed. The meter M2 is designated the "base scale" meter. At the upper right hand portion of the panel is another meter M1 which is the "vernier scale" for indicating very accurately within a small fraction of a percent the amount of gas of a particular type in the sample being indicated. Adjacent the meter M1 is a shunting switch 21 which serves to shunt the meter M1 when rough or approximate readings are being taken. At the left along the center of the panel is a base scale adjustment for the potentiometer P1 (by means of which the 100% indication of the base scale may be adjusted). Centrally of the panel are two rows of adjustments for potentiometers P2, P3, P4, P5 and P13 in the lower row and for potentiometers P6 through P10 in the upper row. These are for adjusting the values of certain potentiometer resistors in the apparatus for achieving linearity of readings. At the right is a range selector 22 which operates gang switches as hereinafter described for selecting the percentage range, 0–20; 20–40, etc., which is indicated on meter M1. The adjustment of the potentiometers P1 through P10 and P13 is preferably made by screwdriver rather than by knobs and for this purpose each of the potentiometer adjustments is provided with a slotted shaft which can be turned by means of a screwdriver properly inserted. I also prefer to provide a covering cap for each of the adjustments as shown in Figure 7, to discourage idle tempering. In Figure 1 the covering caps are removed for clarity of description, but the cap is in place in Figure 7.

Referring now to Figures 2 through 5, in Figure 5 are illustrated those portions of the circuits of the apparatus which are contained in the housing 10, and which are not contained within the drawer 11. In Figure 2 is illustrated a fragmentary horizontal sectional view showing generally the physical arrangement of some of the elements within the drawer 11 and showing particularly at 25 a connector by means of which the circuit elements within the drawer 2 are connected to the circuit elements of Figure 5, which are within cabinet 10.

It is a feature of the present invention that the entire drawer 11 is a self-contained unit which is pre-adjusted, and light filter and photocell selected and matched for analyzing for a particular gas, as for instance "nitrogen," and that the user shall simply slide the drawer into its appropriate position in the cabinet 10 and in so doing the terminal block 25 of the drawer will match and connect to a cooperating terminal block 25A of the cabinet 10 and thus in sliding the drawer into position there are established all of the necessary electrical circuit connections between the components which are in the drawer 11 and the components which are in the cabinet 10 and not in the drawer 11. The reason for this physical layout is that the user shall preferably be enabled to change quickly for the analysis of a sample for its various constituents using one apparatus 10 and a plurality of separate drawers 11, one for each of the selected constituent gases.

Thus the drawer 11 contains a separate oscillator circuit for supplying radio frequency oscillating energy through to the terminals of the sample tube 14 and an appropriate light filter F for a certain gas, and a photocell unit PC, a responsive element 41 for providing a rate of flow indication, together with all of the circuit connections which must necessarily be made adjacent these elements. Then by simply pulling the drawer 11 out and substituting another drawer in which the components are appropriate for another gas the user is enabled quickly to change from the analysis of one gas to another.

In Figure 4 there is illustrated schematically the drawer 11 having the sample tube 14 therein. The front 12 of the drawer 11 rests against the front panel of the chassis 10 when the drawer is in place on rails 9 and in this position that portion of the multiple connector block 25 which is on the drawer will engage an established connection with the various complementary circuits of that portion 25A of the connector block which is mounted in an appropriate position upon the chassis. At the same time the rear end of the gas analysis ionization tube 14 is exposed at the rear of the cabinet and a hose connection at 26 is made to the vacuum pump 27 which may be either remote or adjacent to the apparatus.

The vacuum pump is of such adequate capacity that it will maintain in the gas analyzing tube 14 a sufficient but not excessive condition of evacuation such that the gaseous sample owing through the tube will be ionized and rendered conductive and luminous. The vacuum pump capacity and rate of flow as determined by valve 15 are thus adjusted and selected appropriately in respect to each other for maintaining in the tube the conditions just stated. The drawer 11 itself is constructed of sheet metal 28 in the form of completely closed housing composed of a pan which is attached to the front portion 12 and a cover 29 which slips on top of the drawer all the way around so that when the drawer is closed it will be completely shielded electrically and no light will be permitted to enter into it. Within the drawer there is a central divider 30 which extends from the back 31 to the front 12. This divider extends from the bottom to the top of the drawer and divides it into a chamber 32 in which the photocell is contained and a chamber 33 in which the gas analyzing tube 14 is contained, and in which there are also contained the oscillator and circuits etc. by which the radio frequency power is provided, the gas rate-of-flow indicator, etc. In Figure 2 the circuits for these various elements are eliminated, for clarity in the drawings and only the principal physical elements are shown.

Thus in the space 32 there is located a photocell PC which is mounted in a socket 34 carried by the bracket 35. The bracket is spaced from the divider wall 30 by means of washers 36 and in this space there slides the rear end of the light gate or "shutter" 37 which is simply an apertured panel of metal which extends forward and has an angularly disposed portion at 38 to which the rod 39 is attached. The rod 39 extends through a grommet 40 on the front panel 12 of the drawer and at the front end of the rod is the knob 16. The shutter 37 has an aperture shown at 37A in Figure 3. The aperture is shown in dotted lines since in this figure it is behind the photocell PC. In this position it is directly in registry with a similar aperture 30A in the divider wall 30 and as a consequence light which emanates from the tube 14 can pass as shown by the arrows in Figure 2, directly from the tube 14 thence through the registered apertures 30A and 37A and onto the active element of the photocell PC. The forward portion of the shutter 37 is supported by means of a plurality of large washers, held in spaced position from wall 30 on screws 40. Thus the shutter is held along its edges but it is free to slide backward and forward so that the aperture 37A therein can be moved from the position shown in dotted lines in Figure 3 in which the light passage is open from the tube 14 to the photocell PC, to the position shown in dot-dash lines in Figure 3, in which position the shutter 37 entirely closes over the aperture 30 and permits no light to pass from the tube 14 against the photocell PC.

Within the space 33 the tube 14 extends directly backwardly from the front panel 12 of the drawer and in a position about centrally from the top to the bottom of the drawer and substantially parallel to the divider wall 3. It is not essential that the tube 14 be straight or that access to it be from the front and the back of the housing 10, but this design is convenient and reduces cost. At the front end of the drawer there is a fitting 14A of metal in which the quartz tube 14 is held. At the rear end there is a similar fitting 14B for receiving the rear end of the tube 14. The fitting 14B has a side connection tube at 14C which leads over to the sensitive element of a flow rate indicator at 41, from which an electrical signal is given proportional to the rate of flow of gas through the tube 14. This flow rate indicator is described in greater detail hereinafter. The fitting 14B extends through the rear wall 31 of the drawer and ends as a metallic tube 14D to which the pipe 26 leading to the vacuum pump 27 is connected. It will be noted that the connection blocks 25—25A on the drawer 11 and housing 10 respectively are arranged vertically at one side of the drawer 11, as viewed from Figure 2. Connection block 25—25A is a stock item and has ten leads in it and several spares may be provided.

Also within the space 33 are the components which make up the high frequency transformer oscillating circuit. These components include a transformer generally designated T which is an "air core" transformer having a primary P1, a low voltage secondary S1 and a high voltage output secondary S2 composed of several spaced layers. The transformer is mounted upon brackets 42—47 which extend respectively from the divider wall 30 and side of the drawer and serve by means of short end screws 43—43 to support the insulating core 44 of the transformer which is non-magnetic and has the property of low di-electric loss at high frequencies. Insulating shields are provided at 45 and 46 on the core 44. The secondary S2 is made up of a plurality of spaced sections electrically connected together. Upon the tube 14 there are two metal sleeves 50 and 51 which neatly surround the tube 14. These sleeves are of a size so as to slide neatly and snuggly along the tube to provide adjustment in either direction as shown by the arrows 50A and 51A. This facilitates adjusting the RF circuit and assists in adjustment for linearity of meter reading. The terminals are connected by means of leads 50B and 51B, which are flexible, to small terminals on the insulating washers 45 and 46 and from these the electrical circuit is made successively through the secondary sections S2.

The radio frequency (RF) oscillator tube V3 is also mounted in an appropriate socket on the bracket 42. At the rear wall of the drawer is provided a variable air insulated condenser C13 which is adjustable by means of the screwdriver turnable slotted shaft SS which is exposed at the rear of the drawer. At the rear of the drawer there is also mounted a potentiometer P16 which is likewise provided with a shaft which can be rotated by a screwdriver from the rear of the drawer. The remaining elements of the circuitry contained in the drawer 11 have been omitted from Figure 2 for clarity, but are shown in Figure 4.

Referring to Figure 4, in this figure it will be understood that the connector 25—25A is shown schematically and that the block 25A is mounted upon and forms a part of the housing 10 shown in Figure 1 whereas that portion 25 of the connector block is a part of the drawer. The designations of the various electrical leads however may be considered as extending directly through the connector block. The connector block includes a total of ten leads and may have several spares. From the lead 1C a connection extends directly to one element of the photocell PC and from the other element of the photocell a lead extends through junctions 56 and 57 to lead 2C. From the terminal 3C a circuit extends through a resistor 59 to the junction 57 and from terminal and lead 4C a circuit extends through a resistor 60 through to junction 56. The aforesaid terminals 1C through 4C are shown at the right hand portion of Figure 4 for clarity of illustration but it will be understood that in the entire junction block the terminals are much closer together than illustrated in the drawing and are conveniently grouped in a vertical pattern as shown in Figures 2 and 3. In Figure 4 the next terminal is a ground terminal GR which extends through junction 60 and to a radio frequency bypass condenser C19 to the terminal 61 of the gas flow indicator 41 and thence within the indicator through a heater element 42 and thence through junction 44, within the indicator, and through terminal 45 to junction 46 and thence through resistor R23 and through junction 47 thence through the potentiometer resistor P17 and junction 48 to line and terminal F1, this terminal being one of the two terminals which supply filament voltage of low potential for energizing the heater 42 and the filament of tube V3. From the junction 44 within the indicator element 41 a circuit extends through a thermocouple 49 within the indicator, and thence through terminal 50 of the indicator 41 and through the junction 53 and through a radio frequency bypass condenser C18 to the ground. From junction 53 a circuit extends to the terminal and line V3A. From the adjustable contact of potentiometer P17 a circuit extends to terminal V3B. The two lines V3A and V3B are the lines leading to the gas rate-of-flow gauge M3 in Figures 1 and 5. A circuit also extends from terminal 61 of the indicator 41 thence via line 55 to junction 48 on the line to terminal F1. From the adjustable terminal on potentiometer P16 a terminal extends via line 56 to junction 60 which is grounded. In operation the heater 42 is heated by the same voltage which is applied to the filament of the vacuum tubes of the apparatus. It has been discovered that the amount of heat from the heater 42 which is collected upon the thermocouple 49 is proportional to the rate-of-flow of gas through the tube 14 under the conditions herein described, where the vacuum pump is of large capacity sufficient to maintain within the tube 14 the pressure in the range as stated. Thus, by the simple expedient of a thermocouple connected as indicated and located adjacent the heater 42, as herein illustrated and within a space evacuated to the same degree as tube 14, there is provided a direct simple meter reading of the rate-of-flow of the gaseous sample through the sampling tube 14.

Referring again to Figure 4, from junction 47 (adjacent resistor R23) a circuit extends through an adjustable resistor P18 to junction 62 and thence along the line 63 and junction 64 to terminal and line F2. From the terminal and line 300 v. a circuit extends at 65 through a resistor R22 thence through junctions 66, 67 and 68 to one terminal of the radio frequency transformer primary P. The circuit extends from the opposite terminal of said primary via line 69 to junction 70 which is connected through a variable type condenser C13 to junction 71 which is grounded. A condenser C10 is connected from the grounded junction 71 to junction 68.

The oscillator tube V3 has its plate connected to the junction 70 and its control grid is connected through junction 72 and through the resistor R27 to the junction 67. From junction 66 (adjacent junction 67) a radio frequency bypass condenser C14 is connected to ground and from junction 72 a condenser C11 connects through junction 74 via line 75 through junction 76 and junction 77 to junction 78 which is likewise grounded. From junction 78 a circuit extends through the adjustable resistor P19 and through a fixed resistor R28 to junction 79 which is connected through the condenser C12 to ground. Junction 79 is connected to one terminal of the high frequency secondary S1, the other terminal of which is connected to the screen grid of the tube V3. The heated cathode emitter of the tube V3 is connected to the junction 74. The line 80 extends from junction 62 (on supply line F2–63), thence through junction 81 and thence to one terminal of the heater filament of the tube V3, the other terminal of which is connected via line 84, through junctions 54 and 48 to supply line F1. From junction 82 a line extends through junction 83 thence through condenser C16 to the junction 77. Another condenser C15 is connected between the junction 76 and via junction 85 to junction 81 and the junctions 85 and 83 are connected by a third condenser C24. The three condensers C15, C16 and C24 form a radio frequency bypass network RFB indicated in dotted lines. The secondary S2 is connected as previously described through its flexible leads 50A and 51A to the terminals 50 and 51 respectively which are slidably positionable metallic bands on the outside of the tube 14 in which ionization of the gas takes place.

Referring now to Figure 5 a circuit extends from the terminal 1C via line 90 to junction 91 which is connected through the resistor R29 to the control grid of the amplifier tube V6A. From the junction 91 the circuit 90 extends through the junction 92 and thence through the resistor R33 to the control grid of a companion amplifier tube V6B. From the terminal 2C a circuit extends via line 94 through a resistor R31 thence through a potentiometer resistor P13, which is adjustable and thence through a resistor R32 to the junction 95 which is connected to the zero volts D.C. terminal. From the adjustable contact of the potentiometer resistor P13 a circuit extends through the resistor R30 to the junction 92. From the junction 95 a circuit extends at 96 through junction 97 and through junction 98 and through junction 99 thence through resistor R35 and junction 100 to the emitter of amplifier tube V7A. From junction 98 a circuit extends from resistor R34 and junction 101 to the emitter of the amplifier V6A. The circuits to the filament heaters of these vacuum tubes V6A, V6B, V7A and V7B are omitted but it will be understood that these filaments are all connected in parallel to circuits supplied at terminals F1 and F2 which supply low voltage potential to the filaments. It will be noted that the two circuits F1 and F2 are connected via junction 102 and line 103 to the power input terminal 104 which supplies A.C. voltage to the line F1 and that a circuit extends from junction 105 and line 106 to the terminal 107 which is the companion terminal of the filament supply voltage. The input supply is thus made to the terminals 104 and 107 which are connected respectively to the terminals 102 and 105 and the filament voltage supply is thus made not only to the entire chassis 10 but also to the elements of the drawer unit 11 which are supplied through the terminals F1 and F2 of the connector 25—25A. From the terminal 3C of the connector 25 a circuit extends via line 108 to junction 109, and line 200, the purpose of which is to connect to other linearity balance networks, as shown in Figure 8, where used. From the terminal 4C a circuit extends via line 111 thence through junctions 112, 113 and line 114 to the plate of tube V7A. From junction 113 a connection is made to the plate of tube V6A. From junction 112 a connection extends via line 115 to junction 116 which is connected via line 117 through a resistor R21 to junction 118 which is in turn connected to the supply terminal "300 volts D.C. Regulated" of the input power supply.

From junction 101 on the emitter of tube V6A a circuit extends via line 120 to junction 121 and thence through resistor R39 to junction 122 on line 123. Line 123 is connected to one terminal of each of the bank of adjustable resistors P6 through P10. The opposite end of each of these adjustable resistors is connected respectively to the terminals labeled 0–20, 20–40, 40–60, 60–80, and 80–100 of a rotary selector switch generally designated 125. The selector arm 126 of such switch is connected through junction 127 to one terminal of the meter M1, the opposite terminal of which is connected through junction 128 and line 129 to junction 100 on the emitter of tube V7A. From terminal 127 a circuit extends through the shunting switch 21 to terminal 128 and when the switch 21 is closed the meter M1 will be shunted out of service. Line 123 is connected to each of the two variable elements A1A and A1B of a T-pad attenuator resistor, the third element of A1C of which is connected to the line 130. A shunting bar is provided for the three elements A1A–A1B–A1C as shown. Also connected across the two lines 123 and 130 is resistor R40 and the circuit through line 123 also extends through resistor R41 to one terminal 132 of galvanometer output vernier scale, the other terminal 131, thereof, being on line 130. Thus there are provided the terminals 131 and 132 which are the "Galvanometer Output, Vernier Scale."

From junction 109 on line 108 a circuit extends through resistor R38, P11, which is variable, and resistors P2, P3, P4, P5, P12, which are variable, and then through junction 134 and junction 135, through line 136 and through junctions 137 and 138, which are grounded, to the power supply input terminal designated "zero volts D.C." From junction 134 a circuit may, if desired, extend at 201 similarly to circuit 200 to other Linearity Balance Networks, as shown in Figure 8, where these are used. From the junction 138 the circuit extends via line 140 through junction 141 and line 142 to the junction 97 on line 96. From junction 137 a circuit extends through a resistor R36 and junction 144 to the emitter of the amplifier tube V6B. The control grid of the tube V6B is connected through resistor R33 and line 145 to junction 92. The plate of tube V6B is connected via line 146 to junction 147 on line 117. Junction 147 is also connected through junction 148 and line 149 to the anode of amplifier tube V7B. A voltage regulator tube VR3 is connected between the junction 99 and the junction 148. From the power supply terminal designated "—85 v. D.C. Reg." (meaning negative 85 volts D.C., regulated) a circuit extends via resistors RX and through potentiometer resistor P14 to the junction 141 on line 140.

The variable terminal of the potentiometer resistor is connected via line 150 through junction 151 and line 152 and thence through resistor R48 to junction 153 and resistor R49 and line 154 to junction 155, and thence through line 156 to junction 157 which is in turn connected to the emitter of the tube V7B. From junction 157 a circuit extends through resistor R37 to junction 135 on line 136. The control grid of the tube V7B is connected to junction 159 between resistors P12 and P5, and a circuit extends via line 160 to the terminals marked 0–20 of the rotary switch generally designated 161. The rotary switch has a plurality of terminals designated 0–20, 40–60, 60–80, and 80–100 and a rotary contact 162 which can be brought into selective contact with any of the terminals. It will be noted that the rotary switch has a manual operating knob 22 which is connected not only to the switch 161 but also to the switch 125 so that both of them may be rotated in unison. The contacts of rotary switches, namely the blades 126 and 162 are positioned so that they will each engage the corresponding contacts 0–20 of their switches at the same time and similarly contact contacts 20–40, etc. as the knob 22 is rotated. These contacts, namely 0–20, 20–40, etc. designate the percentage range of base scale meter M2, in which the apparatus is operating. It will be noted that the contact 0–20 of the switch 161 connects to junction 159 whereas the contacts 20–40, 40–60, 60–80 and 80–100 connect respectively to the variable contacts of the potentiometer resistors P5 through P2. In respect to the switch 125 the contact 0–20 is connected through resistor P10 which is variable, the contact 20–40 is connected through the resistor P9 which is likewise variable and the contacts 40–60, 60–80, 80–100 of the switch 125 are connected to the resistors P9 through P6 respectively, each of which is variable.

From the junction 151 on line 152 a circuit extends through resistor R46 and junction 165 thence through resistor R47 to junction 166 which is connected to line 167 through junctions 168 and 170 to one of the output terminals 171 of the "Galvanometer Output Base Scale." The other terminal 172 of the "Galvanometer Output Base Scale" is connected through resistor R44 to the junction 174, which is in turn connected by line 175 to one of the three resistors namely resistor A2C of the T-pad attenuator resistor unit A2. The potentiometer unit A2 has its middle variable resistor A2B connected to the junction 168 and the third resistor A2A is connected to the junction 179. The resistor R42 is connected directly between the junctions 166 and 179. The junction 166 is connected by a line 180 to the junction 144. The junction 179 is connected to one terminal of the meter M2 which shows the "Base Scale" percentage of gas, the other terminal of meter M2 being connected to a variable resistor P1, the opposite end of which is connected through the recorder jack to the terminal 155. The recorder jack is of a type such that when the recorder plug is not inserted the jack will connect the resistor P1 directly to the junction 155. Between the junctions 170 and 174 there is connected resistor R43.

From junction 165 (between resistors R46 and R47) a circuit extends via line 182 through junction 183 and thence through resistor R45 to junction 184 and through circuit 185 to junction 153. From junctions 183 and 184 a pair of lines extend to another output jack designated "Push-Pull Output" which has the framework 187 of the jack grounded. The signal at junctions 183 and 184 is a small voltage relative to ground potential and may be used conveniently with a recorder or amplifier of the push-pull type.

Referring to Figure 6, in this figure the drawer 11F, which normally contains the apparatus shown in Figures 2, 3, and 4 is in this instance deprived of all of the interior fittings except for the connection 25—25A. The shape of the drawer, is however the same and when the drawer 11F is inserted multiple circuit jack element 25 will mate with element 25A on the housing 11. The front panel of the drawer 12 is provided with a grommet 190 through which a multiple circuit cable 191 passes and is anchored. The cable has ten circuits corresponding to the ten circuits of the jack 25—25A and these circuits are connected to the terminals of jack element 25 and extend to a remote location at 200 at which there is located a unit corresponding in all respects to the drawer unit 11 shown in Figures 2–3 except that in this instance it is separate from housing 10. This remote unit is provided with a gas sampling tube 14 into which the gas sample is introduced through the adjustable valve 15. The sample is drawn through the tube 14 by the line 14C which is connected to the vacuum pump, not illustrated in Figure 6. The unit 14 contains the oscillator circuit for applying a radio frequency high voltage to terminals on the tube 14 and contains the photoelectric cell, the light filter, the shutter, which is operated by the pull knob 16, and all the interior circuitry illustrated and described particularly with reference to Figures 2–4. An interior terminal block (not shown), similar to jack element 25 serves as a termination for the individual circuits of cable 191, which are then continued from the terminal block, as from jack element 25 in Figure 4. The advantage of this arrangement, shown in Figure 6, is that it permits the taking of a sample of the gas at a location remote from the main housing 10. All of the circuits for conveying all of the necessary electrical impulses and power supply etc. between the housing and the drawer unit 11F at the remote location are provided by cable 191.

Referring to Figure 8 in this figure there is illustrated a form of circuitry which is especially adapted for the very rapid analysis of a gas sample for a variety of gaseous constituents therein. To do so there are provided as many drawer units 11 as there are gas constituents for which analysis is made. The circuit 108 to the junction 109 is continued via line 200 through junctions 206, 207, 208, 209 and through as many further junctions as is necessary to supply individual "Linearity Balance Networks" for the several gases, for which the system is to be utilized for analysis. Thus referring to Figure 5 the circuit from junction 109 through resistors R38, P11 and resistors P2 through P5 and resistor P12 to junction 134, together with the switch 161 form a "Linearity Balance Network," shown within dotted line 176, the device for use in analyzing a particular gas. For another constituent gas the same "Linearity Balance Network" 176 may be utilized, but must be readjusted for each such constituent, and this takes a little time. In Figure 8 a plurality of such "Linearity Balance Networks" 176, 211, 212, 213 and 214 for constituent gases V2, W2, X2, Y2 and Z2, respectively, are provided, one for each of several constituent gases for which the unit is to be used for analysis. These are preadjusted with reference to calibration samples of the several constituent gases under consideration. Thus there are provided "Linearity Balance Networks" at 176 (corresponding to the same network of Figure 8) and 211, 212, 213 and 214 which are for various constituent gases. Each of these Linearity Balance Networks 176 and 211 through 214 is identical with that shown at 176 in Figure 5.

It will be noted in respect to Figure 5 that the grid of amplifier tube V7A is connected via line 163 to the rotary blade 162 of the switch 161. In Figure 8 the line 163 is connected to a rotary blade terminal 215 of a selector switch generally designated 216. This selector switch 216 has as many terminals on it as there are networks provided. Thus it is provided with a terminal 217 which is connected via line 218 to the common terminal of wiper blade 162 of the switch generally designated 161 of network 176, which corresponds to the similarly numbered elements of Figure 5. All of the resistors in the network 176 correspond exactly to the resistors of the network 176 of Figure 5. Thus from the terminal 109 the circuit extends through resistor R38 and thence through the variable resistor P11, thence through the potentiometer resistors P2–P5 and thence through junction 159 which is connected via junction 236 to the 0–20 position of the rotary switch 161, and from the junction 159 through the variable resistor P12 thence via line 220 to one of the terminals marked V2 of the switch 221 thence through the wiper blade 222 of that switch and via the common line 201 to the junction 135, which corresponds to the similarly numbered junction of the circuit shown in Figure 5.

The remaining linearity balance networks for the gases W2, X2, Y2 and Z2 are similarly wired.

In respect to the control grid connections of tubes V7A and V7B it will be noted that in Figure 5 the junction 158 on the grid of amplifier V7B is connected directly to the junction 159 whereas in Figure 8 the control grid leads 163 and 224 are first taken through the network selector switches 216 and 226 and thence to the appropriate terminals of the selected network. In respect to tube V7A a circuit extends, in Figure 5 from the grid, via line 163, directly to the wiper of switch 161, but in Figure 8, the circuit extends first through switch 216 and through it to the wiper terminal 162 of switch 161 of network 176, or to the corresponding terminals of the rotary switches 232—235 of networks 211—216 respectively, depending upon the setting of switch 216. Similarly, whereas in Figure 5 the grid of V7B is connected directly through junction 159 to the 0–20 terminal of switch 161, in Figure 8 this grid lead is taken through the switch generally designated 226 and through it to the junctions 236—240 respectively and thence through such junctions respectively, to the "0–20" terminals of each network. A connection between junctions 159 and 236 of network 176, and similar connections for networks 211—214, complete the network circuitry.

The three switches 221, 226 and 216 are ganged together so as to be rotated simultaneously and these switches have as many contacts as there are linearity balance networks provided. By rotating the operating knob 230 of the common control the three switches may be adjusted simultaneously for selecting any one of the linearity balance networks that is desired. Similarly the rotary switch 125 (see Figure 5) and the switches 161 and 232—235 of networks 176 and 211—214, respectively are ganged so as to be simultaneously operated by knob 22 (see Figures 5 and 8). In use the switch 125 is always effective along with one of the switches in the network groups consisting of 176 and 211—214 and the balance of the networks will be idle.

*Operation:* In utilizing the method and apparatus of the present invention the vacuum pump 27 is connected to a suitable power source and after inspection and greasing, as is requisite for good pump performance, the pump is placed in operation by closing switch 17 (see Figure 1). The connection 14D of the drawer 11 is made through the tube 26 to the vacuum pump 27. The sampling tube 26 connects to the sampling inlet and passes through a needle valve 15 by which the flow of the sample through the tube 26 may be regulated.

The instrument operates by virtue of the light produced by an electrical discharge through the ionized gases continuously passing into and through the evacuated tube 14 which forms an extended narrow path or conduit. The light emitted by tube 14 is transmitted through a light filter F and falls upon the sensitive element of photoelectric tube PC. Once power is supplied to the "Power Supply" terminals shown in Figure 5 and the drawer is mechanically positioned in housing 10 so as to connect jack elements 25—25A, power will also be supplied to the drawer unit and to all the circuits contained in the housing 10 and drawer 11.

The tube V3 and the circuitry connected to it which includes the condensers C13, C10, primary winding PR, the feed-back secondary S1 and the high voltage secondary S2, together with the electrical constants of the whole circuit forms an oscillating system which oscillates at radio frequencies. Ionized gas in tube 14 is rendered resonantly conductive. To some extent the oscillation may be adjusted by varying the position of the discharge electrodes 50—51 along the tube 14, and variation of the position of such electrodes also aids in effecting linearity of deflection of the meters M1 and M2 in respect to percentages of the gas in the sample. As a consequence of the radio frequency oscillation of the unit, a high voltage in the frequency range of 200–400 kilocycles is applied to the electrodes 50 and 51 and when the tube 14 is evacuated as aforesaid, as for example 500 microns, a discharge will take place therein. The tube 14 may fail to conduct either because the pressure is too high or too low but this can be corrected easily, by adjustment of the needle valve 15 and/or the capacity of the vacuum pump 27. An appropriate pressure, as for example 500 microns pressure, may be obtained continuously in the tube 14 and good operation will ensue. A precise pressure is not essential to good analytical results.

The radio frequency current through the tube 14, due to the potential impressed upon the electrodes 50 and 51, is essentially independent of the pressure in the tube so long as it is conductive. When the instrument is properly adjusted the current through the discharge tube will remain exactly constant while sampling alternately 100% oxygen and various concentrations of nitrogen in oxygen, and will remain essentially constant when sampling various percentages of various other gases mixed together. If it is assumed that analysis is being made for $N_2$ the "zero" adjustment for this gas is made by sampling a 100% pure sample of another gas, such as 100% pure oxygen. After the unit has reached a stable operating condition this 0% (nitrogen) adjustment can thus be made by sampling 100% oxygen (or sampling another gas other than nitrogen, which is of 100% purity). The resistor P1 which is contained at the front of the panel and is shown in Figure 5 adjacent meter M2 between the amplifier tubes V6B and V7B, is then adjusted. After this adjustment has been made the base scale meter M2 will read 0% and if it is assumed that the shunting switch 21 is open, and the rotary switch 22 is at the 0–20 position, the meter M1 will likewise operate at 0 indication.

Under the aforesaid conditions blocking the light from the photo tube by pulling the knob 16 forwardly so as to close the light aperture 38 will have a negligible effect on the meter deflection. If at this time the vernier meter M1 changes its position by more than two or three divisions it is an indication of air leaking into the sampling line and the leak should be corrected before proceeding further.

The adjustment labeled "base scale" is for the "100%" adjustment for the base scale meter M2, and can be set by sampling 100% pure nitrogen and adjusting to full scale deflection. The purpose of the base scale meter M2 is to indicate the approximate concentration of the gas being sampled. The vernier meter M1 may then be set with the vernier scale switch to operate over the proper range to give a very accurate reading. This arrangement is necessary because the characteristic curve obtained from the discharge of the tube 14 is not linear over the complete range from 0 to 100%; however it is quite possible to obtain the required accuracy by providing several, in this instance five, separate ranges selected by the vernier switch designated 22 and labeled "range selector" as it appears in Figure 1. The 0% and full scale adjustments for each of the ranges, from 0 to 20, 20 to 40, 40 to 60, 60 to 80, and 80 to 100, is obtained by a procedure as follows:

(A) It is assumed that the sampling orifice is adjusted to provide the correct pressure in the discharge tube 14 and the sampling tube 26 is connected to a source of 100% gas, as for example 100% nitrogen. Then in order to set the "100%" indication on the meters M1 and M2, the resistor P1 is adjusted until the scale reading of M2 indicates 100% and the resistor P6 is adjusted until the reading on the meter M1 indicates 100%.

(B) In order to set the "0" position of the meter scale this is done by closing the shutter which is accomplished by pulling forward on the knob 16 so as to bring the shutter 37 over the aperture 38 closing off the transmission of any light from the tube 14 to the photoelectric cell PC. Then by adjusting resistor P13 as aforesaid both of the meter scales M1 and M2 will be brought to the "0%" position.

(C) A true sample of gas of for example 20% gas diluted in another gas, is then run into the sampling tube. The range switch 22 is then moved to the "0–20" position. Then the resistor P10 is adjusted until the meter M1 reads "20%" on its meter scale.

(D) Then the range switch 22 is moved to the "20–40" position and the resistor P5 is adjusted until the meter M1 reads "20%." This is electrically the zero position on the scale of this meter under these conditions.

(E) This procedure is duplicated for other percentages of gas samples and when completed will provide a close approximation of the complete linearity of scale deflection for meter M1 from 0% to 100%, with of course, appropriate manipulation of switch 22.

As previously stated, the linearity adjustment must be repeated for each different gas which is sampled and where the time required to do this is of little consequence, such adjustments can be made from known gas samples whenever the instrument and method are used for analyzing a different gas. However where it is desirable to be able to change immediately from the sampling of one gas to the sampling of another gas, it is desirable that a number of different drawers be provided one for each gas and that the system of Figure 8 be utilized and one of the networks 176, 211—214, is precalibrated for each gas, using standardized samples of each such gas for which analysis is to be made. With these preliminaries accomplished the instrument is then already in adjustment in respect to each particular gas for which analysis is to be made. Then to test for gas $V_2$, for example, the drawer sampling unit for such gas is inserted in the chassis, connections are made to tube 14, and switch 230 is positioned for selecting the particular network which has been precalibrated for that gas. In this way no time will be lost in changing over from the sampling in respect to one gas as compared to another gas.

In place of the light filter F which is shown in Figures 2 and 4, there may be utilized other modes of eliminating unwanted light wave lengths from the light emitted by tube 14 before permitting the light to impinge upon photocell PC. Thus there may be utilized a defraction grating or a multiple layer filter made by sputtering layers of diverse metal in multiple layers on a flat sheet of glass, quartz or similar materials transparent while in a vacuum. Such multiple sputtered layers of metal on glass or quartz sharply fractionate light on the basis of wave lengths. The angle of the filter is substantially normal to the light path as shown by the arrows in Figure 2, but may be adjusted slightly from normal with reference to the direction of passage of light from the source to the photocell and by such adjustment may be sharply controlled for selecting the particular wave lengths permitted to pass therethrough.

According to this invention the signal delivered at line 90 to the grids of tubes V6A and V6B is amplified and the output potentials at junctions 101 and 144 are balanced respectively against the potentials at junctions 100 and 157, the latter having been precalibrated by the linearity balance network, utilizing standard percentage samples of the same gas. Since the power supply for all amplifiers V6A, V6B, V7A and V7B is common, the readings provided by the system are accurate to within $\frac{1}{10}$% and reproducible and has a response rate of $\frac{4}{100}$ second or less. For best results the voltage between the terminals "Zero Volts D.C." and "300 volts D.C. Reg." is regulated to plus or minus $\frac{1}{10}\%$, and the power supply to the "—85 v. D.C." terminal is preferably regulated to approximately plus or minus 1%. Current flows from the —85 v. D.C. terminal via resistors RX and a part of P14 and through two parallel circuits the first being from junction 151, through R46, R47, junctions 166 and 144 and R36 to ground and the second being from line 152, thence through R48, R49, junctions 155 and 157 and resistor R37 to ground. The potentials junctions 144 (166) and 157 (155) are responsive respectively to the operation of tubes V6B (input signal) and V7B (calibration signal). Hence between junctions 144 (166) and 157 (155) an output signal is provided but the output signal is a small variable voltage superimposed upon a steady undirectional potential which is unsuited as an input to a push-pull amplifier. Now, according to this invention the steady unidirectional voltage component is obviated. This is done by providing two parallel resistance paths from the signal terminals 144 (166) and 157 (155). Thus one path is from 144 (166) R47 push-pull output junction 165 resistance R46 to junction 151 on line 150—152. The other path is from 157 (155) resistor R49 output junction 153, resistance R48 to line 152, line 152—150 connects through P14 and RX to the —85 v. terminal. The negative gradient from both 144 (166) and 157 (155) acts as a submergence potential which effectively eliminates the unidirectional voltage component at each of the junctions 144 (166) and 157 (155). Consequently at terminals 165 and 153 there is presented a finished signal which (by adjustment of P14) can be made to vary about zero volts. This signal is acceptable for push-pull amplification in recorders etc.

The form of the invention shown and described must be considered only as illustrative. Many variations within the scope of the invention illustrated, described and claimed will be apparent to those skilled in the art, and the invention is therefore not to be limited except as stated in the appended claims.

What I claim is:

1. A gas analyzer system comprising a light transparent conduit having spaced electrodes thereon, means for conducting a gas sample through said conduit under reduced pressure, means for applying a radio frequency potential to said electrodes rendering the gas in said conduit conductive and luminescent, a photo-responsive element adjacent the conduit for receiving light therefrom, light screen means in the path of light between the conduit and photo-responsive element for stopping passage of all light wave lengths except at least some wave lengths of light in the characteristic spectrum of a selected gas and a responsive circuit having an input connected to said photo-responsive element and an output, said responsive circuit including amplifier connected to the input of the responsive circuit, said amplifier being effective to produce an amplified output signal voltage having a variable voltage component and a component of substantially constant polarity and value, a source of steady voltage having a value and polarity substantially opposite to said amplifier component of substantially constant polarity and value, said source of steady voltage being connected to said amplifier and forming therewith the output of said responsive circuit.

2. A gas analyzer system comprising a light transparent conduit having spaced electrodes thereon, means for conducting a gas sample through said conduit under reduced pressure, means for applying a radio frequency potential to said electrodes rendering the gas in said conduit conductive and luminescent, a photo responsive element adjacent the conduit for receiving light therefrom, light screen means in the path of light between the conduit and the photo-responsive element for stopping the passage of all light waves except at least some wave lengths of light in the characteristic spectrum of a selected gas, and a responsive output circuit connected to said photo-responsive element, said responsive output circuit including a first amplifier connected to said photo-responsive element and first control means for said first amplifier and connected thereto, said first control means including a first plurality of selectively connectable variable resistors, a second amplifier having an input connected to the output of the first amplifier and an output, second control means for said second amplifier and connected thereto, said second control means including a second plurality of selectively connectable variable resistors, and means connecting the first plurality of selectively connectable variable resistances to the output of the second amplifier for balancing the potential across said first plurality of selectively variably connectable resistance against the output of said second amplifier, said first and second plurality of resistances being connected mechanically for selection in prescribed succession.

3. The method of determining the percentage of a certain gas constituent in a gaseous mixture of gases which comprises introducing a gaseous mixture from a source of supply into a light transparent enclosure, continuously evacuating the light transparent enclosure while the source of gaseous mixture is connected thereto, applying a radio frequency potential across at least a portion of said enclosure to render the gaseous mixture in the enclosure electrically conductive, passing the resultant light emitted by the conductive gaseous mixture in the enclosure through a light controlling zone, absorbing in the light controlling zone the light of wave lengths other than at least some of those in the spectrum produced by said certain gas, impinging the wave lengths passed through the light controlling zone on a photo responsive device for producing utilizable electric signals, amplifying the utilizing signal, producing a calibration signal of a voltage value that is substantially proportional to the photoelectric responsive signal produced when a calibration sample of corresponding concentration of said certain gas is introduced into said enclosure, and balancing the calibration signal against the utilizable signal.

4. The method of determining the percentage of a certain gas constituent in a gaseous mixture of gases which comprises introducing a gaseous mixture from a source of supply into a light transparent enclosure, restricting the flow of the gaseous mixture from the source through the enclosure, continuously evacuating the light transparent enclosure while the gaseous mixture is being introduced therein, applying a radio frequency potential across at least a portion of said enclosure to render the gaseous mixture in the enclosure electrically conductive, passing the resultant light emitted by the conductive gaseous mixture in the enclosure through a light controlling zone, absorbing in the light controlling zone the light of wave lengths other than at least some of those in the spectrum produced by said certain gas, and impinging the wave lengths passed through the light controlling zone on a photo-responsive device for producing a utilizable electric signal, said method being further characterized in that it includes the steps of amplifying and delivering the utilizable signal as an intermediate signal having a unidirectional component potential which is of certain sign with reference to ground and a fluctuating signal component of minor proportions superimposed thereon, and balancing said intermediate signal against a submergence potential which is unidirectional and substantially equal to said unidirectional component but of opposite sign as compared thereto and delivering the resultant fluctuating component as a signal alternating with reference to ground potential.

5. An apparatus for determining the percentage of a certain gas constituent in a gaseous mixture comprising a light transparent enclosure having a restricted inlet thereinto adapted to be connected to a source of gaseous sample which is to be analyzed and an outlet therefrom which is adapted to be connected to a source of evacuation capable of reducing the pressure in said enclosure, spaced electrodes on said enclosure, means for supplying radio frequency electrical potential to said electrodes for ionizing and rendering conductive and luminescent the evacuated gases within said enclosure which are to be analyzed, photoelectric responsive means positioned adjacent the enclosure to receive light emitted therefrom when the gas therein is ionized and rendered conductive and luminescent and filter means positioned in the light path between the enclosure and the photoelectric means for absorbing all light except wave lengths in the characteristic light spectrum of a certain gas, the percentage of which is to be determined, said apparatus being further characterized in that there is provided electric circuit means for producing a potential that is substantially proportional to the photo-responsive signals produced when a calibrated sample of corresponding known concentration of said certain gas is introduced into said enclosure, and that the photoelectric responsive means includes an output circuit that is connected in balanced relationship against the electric circuit means.

References Cited in the file of this patent
UNITED STATES PATENTS

| | | |
|---|---|---|
| 2,244,732 | Schmitt | June 10, 1941 |
| 2,300,916 | Furedy | Nov. 3, 1942 |
| 2,670,649 | Robinson | Mar. 2, 1954 |
| 2,708,387 | Broida et al. | May 17, 1955 |
| 2,767,325 | Harjes et al. | Oct. 16, 1956 |
| 2,790,438 | Taplin et al. | Apr. 30, 1957 |

OTHER REFERENCES

"A Convenient Chamber for the Study of Ions and Electrons in Gases," Journal of the Optical Society of America, vol. 16, No. 3; March 1928, pages 191–195, Loeb et al.